United States Patent [19]
Bishop

[11] 3,823,957
[45] July 16, 1974

[54] STABILIZER FOR STEERABLE WHEELS OF A VEHICLE

[76] Inventor: Thomas M. Bishop, Tuck Rd., Cedartown, Ga. 30125

[22] Filed: Nov. 10, 1972

[21] Appl. No.: 305,563

[52] U.S. Cl.............................. 280/94, 24/201 A
[51] Int. Cl............................................. B60g 3/00
[58] Field of Search .............. 280/87, 94; 24/201 A

[56] References Cited
UNITED STATES PATENTS

| | | | |
|---|---|---|---|
| 3,333,863 | 8/1967 | Bishop................................ | 280/94 |
| 3,393,919 | 7/1968 | Ragsdale............................. | 280/94 |
| 3,448,991 | 6/1969 | Leggett................................ | 280/94 |
| 3,721,455 | 3/1973 | Blanton............................... | 280/94 |

FOREIGN PATENTS OR APPLICATIONS

| | | | |
|---|---|---|---|
| 174,281 | 1/1922 | Great Britain....................... | 280/94 |

Primary Examiner—David Schonberg
Assistant Examiner—Terrance L. Siemens
Attorney, Agent, or Firm—Jones, Thomas & Askew

[57] ABSTRACT

A pair of stabilizers for vehicles exert inward forces on the steerable wheels of the vehicle. The stabilizers each include a plate fixed to the spindle of a steerable wheel, and springs are connected in series with each other and with a flexible connecting means between the plate and the frame of the vehicle. The springs can be placed in various arrangements in series with the flexible connecting means and the assembly can be arranged to accommodate the contours of the vehicle's suspension system.

3 Claims, 7 Drawing Figures

STABILIZER FOR STEERABLE WHEELS OF A VEHICLE

BACKGROUND OF THE INVENTION

This invention relates to a stabilizing device for steerable wheels of a vehicle. Vehicles such as automobiles and trucks use a suspension system for the steerable wheels in which the wheel is carried on a spindle, the spindle being supported on a kingpin, or a pair of ball-joints, about which the spindle can pivot to allow the steering of the vehicle. The kingpins or ball-joints are carried by upper and lower arms of the suspension system; and, whether kingpins or ball-joints are used, the weight of the vehicle causes a torque about the pivot that tends to cause wear on the pivoting structure.

Initially, the torque is compensated for by setting the camber of the wheels so that, under normal loading, the plane of the wheels will be substantially vertical and the surface of the tires will be flat on the road to provide uniform wear of the tires. When the suspension system wears, however, the pivoting structure becomes loose and allows the wheels to assume a camber that is further emphasized by normal loading of the vehicle. This causes the tires of the vehicle to wear unevenly. Additionally, once the suspension system is loose from wear, the wheels are loose with respect to the vehicle which causes the vehicle to be difficult to control.

The prior art solutions to these problems generally have taken the form of springs to provide a torque on the spindle of the wheel that is opposed to the torque created by the weight of the vehicle. While such a solution works in principle, there have been difficulties involved in the use of the devices that provide the torque. The prior art devices, such as the wheel stabilizer disclosed in my U.S. Pat. No. 3,333,863, issued Aug. 1, 1967, usually have been made with rigid parts that must be arranged in a straight line leading to the point of connection with the wheel structure and the various parts of the prior art devices normally have been arranged in a definite and invariable sequence. These features are undesirable in view of the variety of suspension systems in common use. Though there are only a few different types of automobile and truck suspension systems, the particular size, configuration and arrangement of parts in each system is such that a wide variety of wheel stabilizing apparatus must be available to provide wheel stabilizers for all of the more popular suspension systems.

In addition, many of the prior art wheel stabilizing devices require attachment to the backing plate of drum brakes, and with the popularity of disc brakes, such wheel stabilizing devices are virtually impossible to install because there is no means of attaching the device to the wheel assembly of the vehicle.

SUMMARY OF THE INVENTION

The present invention overcomes the above-mentioned and other difficulties with prior art devices by providing a plate connectable to the spindle of a steerable front wheel, and a plurality of springs and a flexible connecting means connected in series with each other, so that the springs and flexible connecting means can be placed in any sequence with respect to each other. The springs and flexible connector can be arranged in different series without losing the effectiveness of the device.

The plate is connected to the spindle of a steerable wheel and the series of springs and flexible connecting means connected at their ends to the plate and the frame of the vehicle. The assembly is arranged to be installed on a vehicle with no welding or other use of heat that could be dangerous in a hazardous environment, and wheel backing plates are not required on the vehicle.

These and other features and advantages will become apparent from consideration of the following specification when taken in conjunction with the accompanying drawings.

DESCRIPTION OF THE PREFERRED EMBODIMENTS

Figure 1:
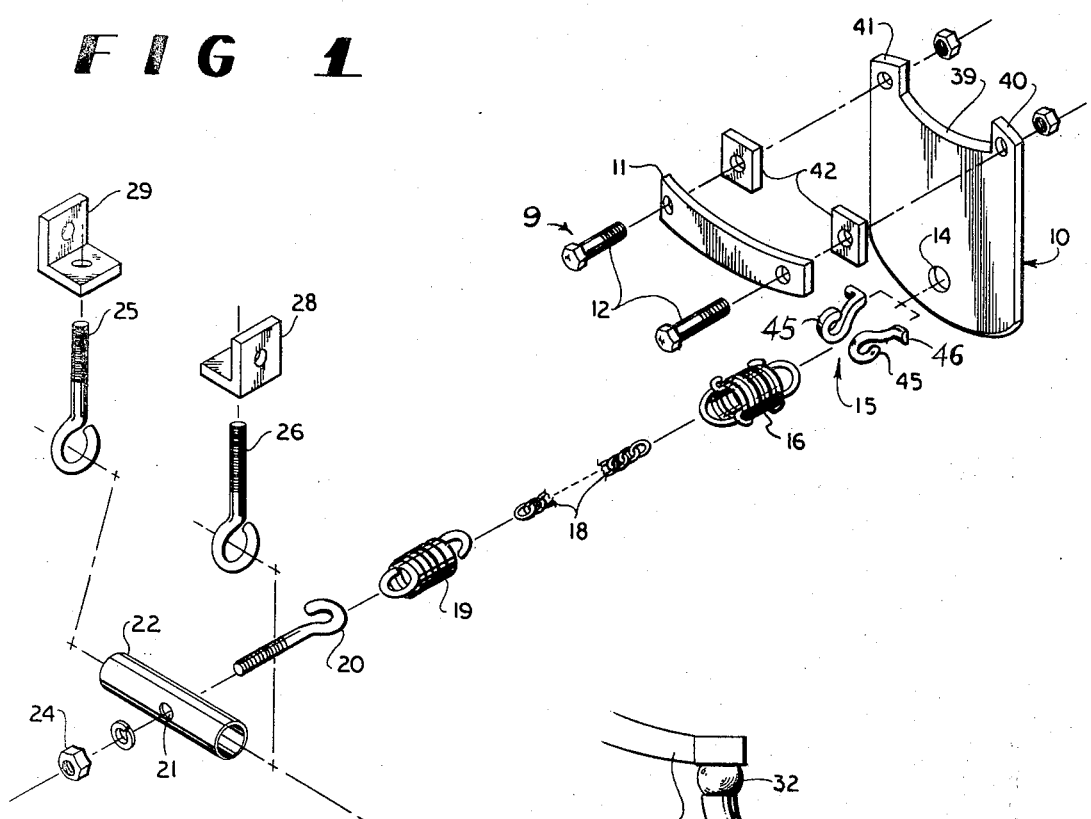
FIG. 1 is an exploded perspective view of one form of stabilizer made in accordance with the present invention.

Referring now more particularly to the drawings and to those embodiments of the invention here chosen by way of illustration, the various parts of one form of the stabilizer 9 are best shown in FIG. 1. The stabilizer 9 includes a series of elements including plate 10 to be used on vehicles that do not have a brake backing plate, e.g. on vehicles that have disc brakes. The support plate 10 is to be fixed to the spindle plate that supports the wheel spindle, and is fixed thereto by a clamp bar 11 with appropriate screws 12.

The lower edge of the support plate 10 has a hole 14 to receive hook means generally designated at 15 which will be described more fully hereinafter. Hook means 15 serves as the attaching means for the series of springs; and, as illustrated in FIG. 1, the draw-bar spring 16 is connected to the hook means 15.

The draw-bar spring 16 is a relatively weak spring, and is the first to be stressed to its limit. This allows the vehicle's wheels to be turned to steer the vehicle without requiring undue force for proper steering.

The spring 16 is shown as connected to one end of a chain 18 which comprises a flexible connecting means, and the chain 18 is connected at its other end to a spring 19. The spring 19 is a relatively strong spring that can hold the wheels against heavy road shocks, and is carried at its other end by an eye bolt 20 which passes through an appropriate hole 21 in an anchor bar 22. The eye bolt 20 is threaded to receive a nut 24 which can be tightened or loosened to vary the tension on the springs.

The anchor bar 22 is mounted on the lower arm of the suspension system, and various hardware is provided for this mounting. There is a pair of eye bolts 25 and 26, threaded at one end, and a pair of angle brackets 28 and 29 for various mounting situations, some of which will be discussed later.

Figure 2:
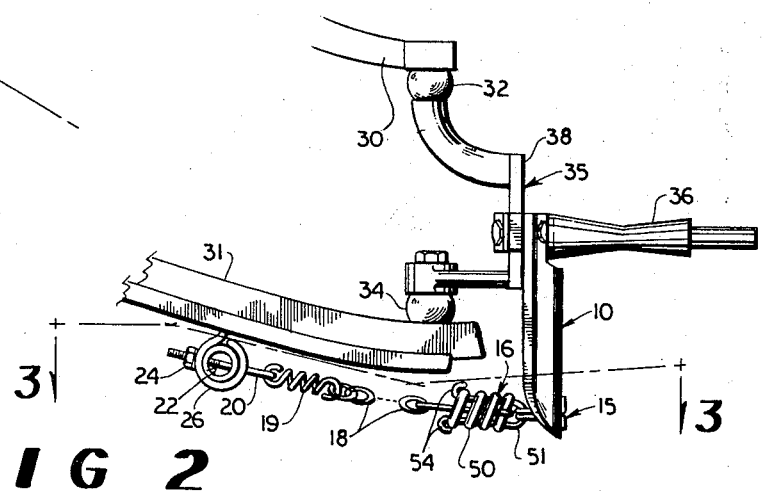
FIG. 2 is a side elevational view of the device of FIG. 1 installed on one form of conventional suspension system.

The upper and lower arms of the vehicle suspension system designated at 30 and 31 respectively in FIG. 2 carry upper and lower ball joints 32 and 34, and the ball joints carry the wheel spindle assembly 35. The wheel spindle assembly 35 includes spindle 36 which protrudes from a spindle plate 38.

The support plate 10 partially overlaps the spindle plate 38 and has an upper peripheral concavity 39 in its upper edge to receive the spindle 36, while the ears 40 and 41 extend up beyond the concavity 39. The ears 40 and 41 have threaded holes therein to receive the screws 12; thus, the clamp bar 11 can be placed on the spindle plate 38 opposite the plate 10, the screws 12 can be passed through the holes in the clamp bar 11, through spacers 42 if required, and threaded into the holes in the ears 40 and 41. The screws 12 should be of such length that they will not protrude substantially beyond the plate 10 so that they will not interfere with some part of the brake mechanism.

Both support plate 10 and clamp bar 11 are curved, each being concave toward the spindle plate 38. The support plate and its clamp bar therefore are held firmly on the spindle plate 38 and form a compact assembly that will not interfere with the normal mechanism of the wheels or the suspension system.

The hook means 15 provides a simple, effective and efficient device to attach a spring to the lower edge of the plate 10. Hook means 15 comprises two eye hook pieces that are made of hemi-cylindrical stock, with one surface of each hook element being flat and the opposite surface of the hook being semi-circular. An anchoring bend 46 is made by bending the stock at substantially 90° with respect to the plane of the hook 45, with the curved surface of the stock facing the eye of the hook.

From this description it will be seen that two of the hooks can be placed together with their flat sides contiguous to form the hook means 15 which will comprise an eye 48 (FIG. 3) with anchoring bends 46 extending in opposed directions along a line approximately parallel to the centerline of the eye 48. Furthermore, as best shown in FIG. 3, the curved sides of the anchoring bends 46 will ride against the plate 10.

To install the hook means 15, the flat sides of the anchoring bends 46 can be placed together to form a single cylindrical shank that will pass through the hole 14 in the plate 18. Once the shank is passed through the hole, the hooks 45 are brought together to form the eye 48 which will cause the anchoring bends 46 to diverge to prevent withdrawal of the hook means 15.

Figure 3:
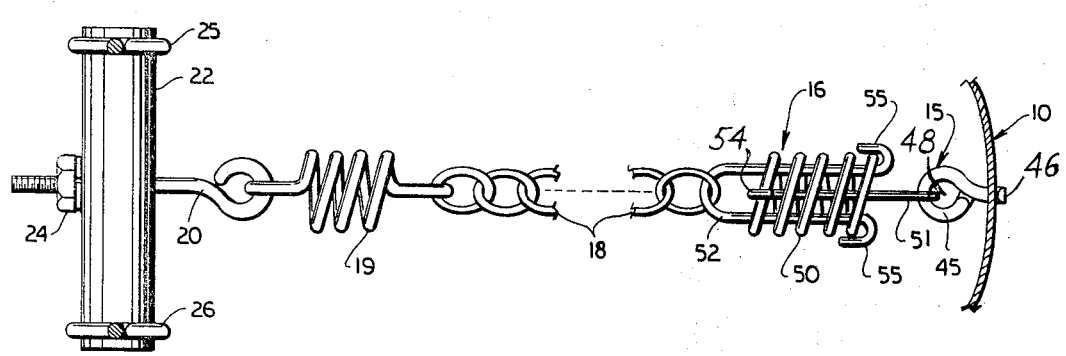
FIG. 3 is an enlarged view taken substantially along the line 3—3 of FIG. 2.

As is shown in FIG. 3, the support plate 10 will be rotated as the wheels of the vehicle are turned for steering the vehicle. Since the curved sides of the anchoring bends 46 are against the plate 10, the hook means 15 will tend to roll as the plate 10 is rotated, rather than sliding or binding, thereby decreasing the wear on both parts.

Draw bar spring 16 is made up of a coiled spring 50 having a pair of draw bars 51 and 52. The draw bars 51 and 52 are U-shaped pieces having return bent hooks 54 and 55 at their extending ends. The U-shaped draw bars 51 and 52 are inverted with respect to each other so that the hooks 54 engage one end of the spring 50 while the hooks 55 engage the opposite end of the spring 50. The force is exerted on the draw bars 51 and 52, so the hooks 54 and 55 are brought together, resisted by the spring 50. When the spring 50 is fully stressed, the spring will be totally collapsed so that additional force will be resisted by the metal of the spring 50 and will not deform the spring.

The embodiment of the invention shown in FIGS. 1, 2 and 3 has a link chain 18 connected to the draw bar 52 which provides some flexibility between the draw bar spring 16 and the spring 19. The spring 19 is hooked at one of its ends to chain 18 and at its opposite end to the eyebolt 20, and the eyebolt 20 is fixed to the anchor bar 22.

The anchor bar 22 can be welded to the lower arm 31 of the suspension system if desired; however, when welding is undesirable, the bar can be fixed to the arm 31 by means of the eyebolts 25 and 26. With the threaded eyebolts 25 and 26 and the angle brackets 28 and 29, the anchor bar 22 can be mounted on virtually any popular suspension system. One arrangement is shown in FIG. 4 of the drawings.

Figure 4:
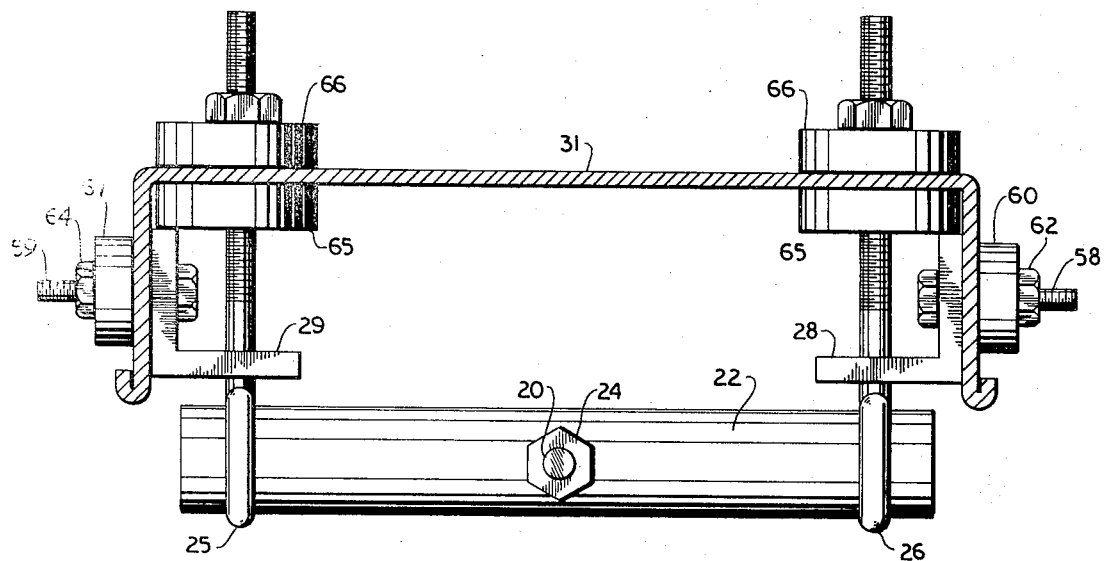
FIG. 4 is an enlarged rear elevational view of the anchoring means shown attached to a suspension system.

In the embodiment illustrated in FIG. 4 the arm 31 is an inverted channel shape, and is made of sheet metal. The angle pieces 28 and 29 are fastened to the sides of the channel that comprises the arm 31 by means of screws 58 and 59 which are surrounded by washers 60 and 61 and held in place by nuts 62 and 64. The washers 60 and 61 are very heavy washers so that, in conjunction with the angle pieces 28 and 29, the arm 31 is reinforced.

The eye bolts 25 and 26 are here shown as long enough to extend also through the arm 31; and, washers 65 and 66 are placed on each side of the arm 31 to reinforce the arm. The eye bolts 25 and 26 are so located that the anchor bar 22 is held snugly against the arm 31 so that a very strong mechanical system is provided.

Figure 5:
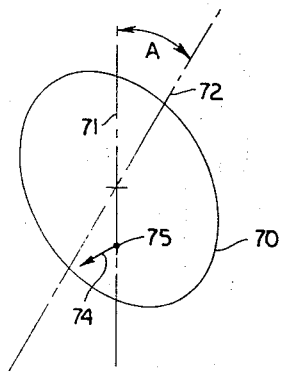
FIG. 5 is a diagrammatic view illustrating the operation of the device.

Considering the operation of the apparatus, attention is directed to FIG. 5 of the drawings which shows a diagrammatic illustration of the motions involved. The circle 70 represents a steerable wheel of a vehicle, the line 71 represents the vertical line extending through the axis of rotation of the wheel and the pivot axis of the wheel, and the line 72 represents the pivot axis or the axis about which the wheel pivots when the wheel is turned for steering. The angle A between the lines 71 and 72 is the caster angle which is here exaggerated for clarity.

The stabilizer of the present invention is extends through the vertical centerline 71 and the force exerted on the wheel is indicated by the vector 74; therefore, it will be seen that there is a short lever arm between the point of attachment 75 and the axis of pivoting represented at 72. Because of this, the wheel will tend to rotate inwardly about the axis 72. With a stabilizer on each of the steerable wheels, the forces will be balanced so that the net effect is that the steerable wheels will remain straight ahead until forced to rotate by means of the conventional steering mechanism.

When the wheels are pivoted about their axes, such as the axis 72, one of the draw bar springs 16 will be compressed, and the springs 16 are so designed that they will be completely compressed when the wheels are pivoted to their maximum extent. While the spring 16 on one wheel is stressed, the spring 16 on the opposite wheel is relaxed to provide a spring force that will tend to direct the wheels straight ahead. Therefore, the wheels will always tend to be straight ahead, and this feature will give the steering quick recovery when the wheels are turned, and will hold the wheels straight ahead in spite of road hazards and the like.

From the foregoing, it will be seen that, when the steerable wheels are straight ahead, the springs 16 will exert a force inwardly of the wheels to reduce the stress on the suspension system as previously discussed. Since the lever arm through which the spring acts is quite short, the springs 16 can be strong enough to be effective without rendering the wheels too difficult to turn. The wheels are thus held so that the vehicle moves straight ahead, and the shocks transmitted to the steering system are reduced since they are counteracted by the springs 16 acting in concert with the suspension system.

When the wheels are turned to their full extent, the springs 16 are no longer effective because they are fully compressed; however, at this point the springs 19 absorb any road shocks. Further, since the springs 19 have no function other than to absorb road shocks (i.e., they are not involved in steering the vehicle) the springs 19 can be very strong to hold the wheels against large shocks to protect the steering and suspension system from damage.

Figure 6:
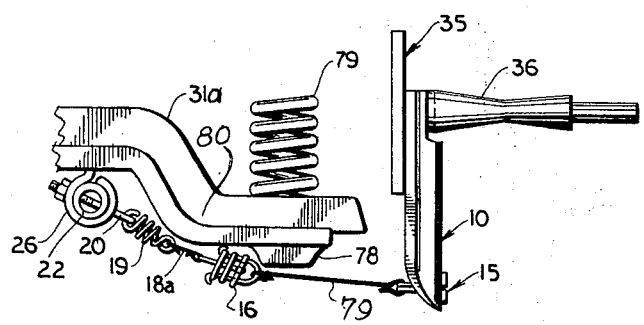
FIG. 6 is a view similar to FIG. 2 showing a different form of suspension system with the stabilizer of the present invention installed thereon; and, FIG. 7 is a view similar to FIG. 3 showing a modified form of the present invention.

FIG. 6 shows a different design of a suspension system to illustrate the versatility of the stabilizer of the present invention. The vehicle suspension system includes a lower arm 31a which has a deep well 78 where the coiled spring 79 sits. Since the well 78 is close to the wheel, the spring 16 cannot be placed adjacent the plate 10 without interfering with this well 78.

For this situation, a cable or the like 79 which comprises a flexible connecting means is connected to hook means 15, the cable 79 being long enough so that the spring 16 is placed inwardly of the well 78. The spring 16 is therefore free of any contact with parts of the suspension system.

From the spring 16, a flexible connector 18a goes to the spring 19, the spring 19 being placed beyond the sharp bend 80 in the arm 31a. Though it is possible to use the chain 18 as in FIGS. 1–3, it is desirable to use a flexible connector that will not cause damage to the arm 31a. For example, a plastic-sheathed braided cable can be used, or a fiber-reinforced plastic strap. It will be understood that the various components of the stabilizer assembly 9 of the present invention can be placed at any convenient location by using various connectors of various lengths to conform to the particular suspension system.

Figure 7:
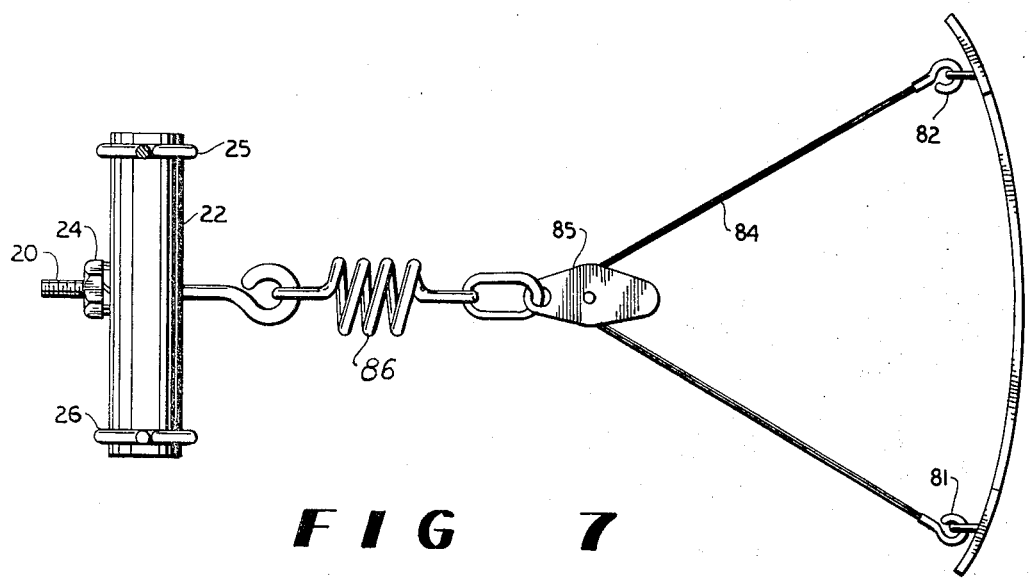

FIG. 7 of the drawings shows a modified form of connection between the support plate 10 and the springs of the assembly. In this embodiment, the plate 10 has a pair of rings 81 and 82 that are fixed to the plate 10. A flexible cable 84 is connected to each of the rings 81 and 82, and is trained over a pulley 85. The pulley 85 is then connected to a spring 86, and the spring 86 is attached to the lower arm of the suspension system as previously described.

This arrangement can be used to avoid any mechanism that may interfere with the center attachment. It can also be used with a single spring 86 as illustrated, or with multiple springs as in the previously described embodiments.

When the plate 10 is rotated with the wheel when the vehicle is steered, the cable 84 will move over the pulley 85; however, the plate will also move away from or toward the frame of the vehicle about its pivot axis 72 (FIG. 5) so the spring 86 will be put into more or less tension to achieve the same results as described above.

It will therefore be seen that the stabilizer of the present invention is adaptable to virtually any vehicle having steerable wheels, at least one of the embodiments of the invention being such that installation would be quick and simple. Since there is no complex fitting of parts or the like required, the stabilizer can be installed much more quickly than other stabilizers.

It will be understood that the embodiments here chosen are by way of illustration only, and numerous changes and modifications may be made and the full use of equivalents resorted to, without departing from the scope of the invention as defined by the appended claims.

I claim:

1. In a stabilizer for the steerable wheels of a vehicle, the vehicle having a suspension system with a spindle assembly upon which a steerable wheel is mounted, the stabilizer including anchor means fixed to the suspension system, hook means effectively fixed to the spindle assembly, and spring means connected between the anchor means and the hook means to urge the spindle assembly inwardly beneath the vehicle at a level below the spindle, the improvement therein including a plate member for connection to the spindle assembly and for extending below the spindle assembly and defining an opening therein below the spindle assembly, and a pair of similar hook members each formed from a length of metal of approximately hemi-cylindrical cross section and bent at one end to form an approximately circular bend defining an opening with the flat surface of the length of metal facing one side of the circular bend, and the other end portion of said length of metal extending away from the center portion of said opening with its flat surface is approximately the same plane as the flat surface of the circular bend, and the distal end of said other end portion angled away from the flat surface of said circular bend to form an anchoring bend, whereby the anchoring bends of the pair of hook members are placed with their flat surfaces in abutment and are inserted through the opening in the plate and the hook members are urged on into the opening by moving the flat surfaces of the hook members together and spreading the anchoring bends apart, and the spring means is connected to the circular bends.

2. A stabilizer according to claim 1 and wherein said spring means includes a plurality of springs connected in series, and one of said plurality of springs is a compression spring, and means for compressing said one of said plurality of springs before the others of the plurality of springs when said spring means is placed in tension.

3. A stabilizer according to claim 1 and wherein said spring means includes two springs and a flexible connector connected at its ends to said springs.

* * * * *